[11] 3,572,879

[72] Inventors Heinrich Nassenstein
Leverkusen;
Manfred Kliemann, Schildgen, Germany
[21] Appl. No. 748,635
[22] Filed July 30, 1968
[45] Patented Mar. 30, 1971
[73] Assignee AGFA-Gevaert Aktiengesellschaft
Leverkusen, Germany
[32] Priority Aug. 18, 1967
[33] Germany
[31] A56531

[54] PRODUCING HIGH QUALITY HOLOGRAMS BY COPYING
3 Claims, 1 Drawing Fig.
[52] U.S. Cl. .................................................. 350/3.5, 355/2
[51] Int. Cl. ...................................................... G02b 27/00

[50] Field of Search........................................... 350/3.5; 355/2

[56] References Cited
OTHER REFERENCES
Ramberg, RCA REVIEW Vol. 27. Dec. 1966, pp 467— 499 (pp 479— 487 relied upon) copy in 350/3.5

*Primary Examiner*—David Schonberg
*Assistant Examiner*—Ronald J. Stern
*Attorney*—Connolly and Hutz ABSTRACT: The production of a hologram free from undesirable line structures by forming a phase hologram by bleaching an absorption hologram and then copying the phase hologram using a gas discharge tube to radiate the phase hologram with and thus produce a hologram completely free from coarse residual fringes.

PATENTED MAR 30 1971
3,572,879
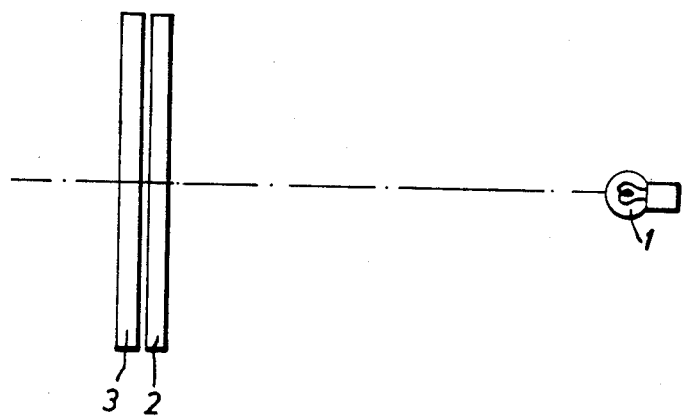
INVENTORS:
HEINRICH NASSENSTEIN, MANFRED KLIEMANN.
BY

PRODUCING HIGH QUALITY HOLOGRAMS BY COPYING

The present invention relates to a method of producing high quality holograms.

Normal holograms which are produced by diffraction and interference effects show coarse residual fringes due to dust and dirt, hereinafter called undesirable line structures, which reduce the value of the reconstructed picture. Whilst these effects can be reduced by complicated measures using high-quality optical components, such measures restrict choice of the arrangement used for exposing the hologram.

It has now been found that high-quality holograms can be produced in a simple manner by first of all producing a phase hologram, which is then copied. It has surprisingly been established that such a phase hologram can be copied just as well as a density hologram and that, in this copying process, the undesirable line structures, which are still present on the phase hologram as phase structures, are not copied. The data-carrying fine interference structure is however transferred to the copy, as can be seen in the satisfactory reconstruction of the picture or image on the copy. A copy of macroscopically uniform density is thus obtained which is completely free from the undesirable line structures present in the original. This is due to the fact that the copy is not a copy in the conventional sense, but is a holographic copy, i.e. a copy is a hologram of the phase hologram original. The phase hologram used as the original can be directly produced in a manner known per se by various photographic processes or, advantageously, by bleaching out density holograms to give phase holograms in a manner known per se. In another advantageous development of the method according to the invention, a gas discharge lamp is used as light source during the copying. One may use for this purpose, a mercury arc lamp, using a filter for the green mercury line. In addition, one also may use a bleached image plane hologram with inline reference pencils as original, i.e. a hologram in which the reference pencil is incident in the optical axis, in which case it is advantageous to use an incandescent lamp as light source for the production of the copy. By using gas discharge lamps and incandescent lamps as light source according to the invention with very small coherence length of the light, the formation during the copying process of the new line structures which are found in the previously used methods when working with a laser is avoided.

In the method according to the invention, it is now possible when exposing the hologram, to exercise a free choice over the arrangement, without need to consider any disadvantageous interference effects. In particular, the method allows the production of large numbers of holograms which are completely free from disturbing line structures by copying from one phase hologram. If so desired, these copies can be reconverted to phase holograms, either by bleaching a density hologram or by another photographic process which is known per se and which leads directly to a phase hologram.

A relevant literature reference is "Zeitschrift fuer angewandte Physik," Vol. 22, Issue 1, pages 37—50 ("Image-forming method with reconstruction of the wave field (holography))," (by H. Nassenstein), where the production of phase holograms is, for example, described. This literature reference also contains a full record of the pertinent literature.

Another pertinent article is by E. B. Brumm in Applied Optics, Vol. 5, No. 12, Dec. 1966, pages 1946—1947 with particular reference to FIG. 1. This is pertinent to the performance of the copying process wherein a previously produced hologram is copies.

FIG. 1 is a diagrammatic illustrating the radiation from the lamp or gas discharge tube and the relative positioning of an original phase hologram and a product hologram on a photographic plate.

In FIG. 1 a light source is provided which is preferably a gas discharge tube. The light source 1 emits a radiation illustrated by the dot and dash line. The radiation is projected to a phase hologram 2 and after being transmitted through the phase hologram 2 impinges on a photographic plate 3 on which the product hologram is produced.

We claim:

1. In the method of producing holograms free from coarse residual fringes the steps of first bleaching an absorption hologram to form a phase hologram, projecting a light beam of short coherence length from a light source through said phase hologram and subsequently impinging said beam on a photographic plate so as to create a holographic copy of the phase hologram on the photographic plate.

2. In the method as claimed in claim 1 using a gas discharge tube to produce the short coherence length light beam.

3. In the method as claimed in claim 1 using an incandescent lamp as said light source.